Nov. 15, 1927.
J. H. WARRICK
OIL GAUGE
Filed Jan. 19, 1924
1,649,375
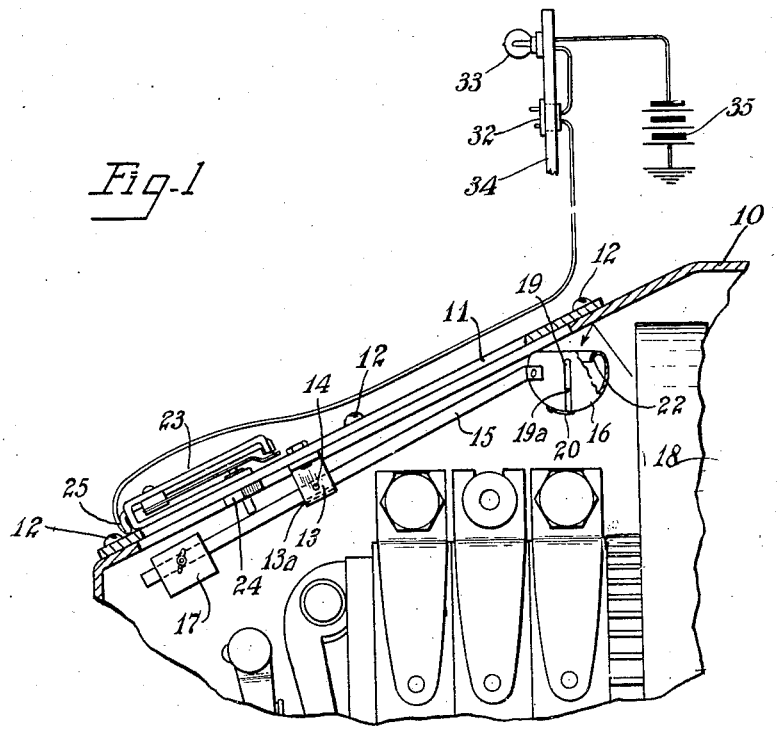
Fig-1
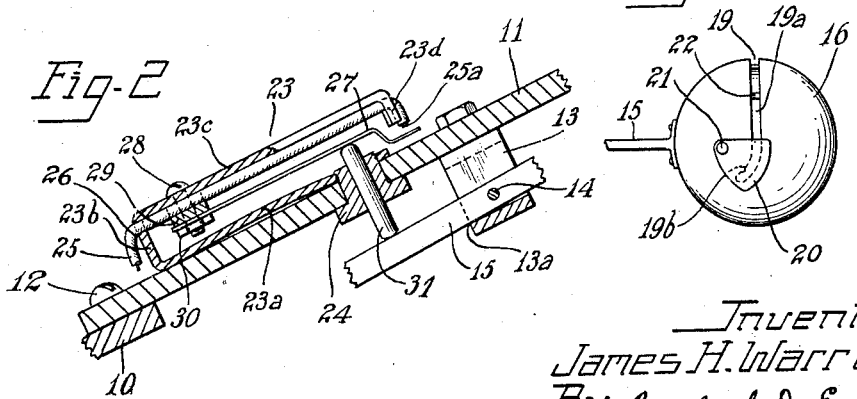
Fig-2
Fig-3
Inventor
James H. Warrick,
By Willard D. Eakin
Atty- Patented Nov. 15, 1927.

1,649,375

UNITED STATES PATENT OFFICE.

JAMES H. WARRICK, OF BEAVER, PENNSYLVANIA.

OIL GAUGE.

Application filed January 19, 1924. Serial No. 687,207.

This invention relates to indicating devices or the like adapted to respond to the condition of the oil supply in the housing of an automobile engine or similar mechanism, and is especially applicable to engines which are lubricated by the splash system. Devices intended to be responsive to the condition of the oil supply have been proposed heretofore, but so far as I am aware no one of them applicable to the splash system of lubrication has been of such simple construction and dependability of operation as to come into general use.

My general object is to provide an improved device adapted to function in accordance with the condition of the oil supply in the housing of a splash-lubricated mechanism, visibly to indicate or otherwise to manifest or register such condition. More specific objects are dependability, economy, lightness, safety and simplicity in a device of this character especially applicable to the splash system of lubrication. A further object is to provide for ready adjustability in such a device, so that it may be set to function at one or another condition of the oil supply, as may be desired. Another object is to avoid inaccuracy, in such a device, incident to the movement of an automobile over rough roads or of a boat on rough water. A still further object is to provide improved means adapted visibly to indicate the condition of lubrication, as upon the instrument board of an automobile.

Of the accompanying drawings:

Fig. 1 is a fragmentary, vertical, longitudinal section through the transmission and adjacent parts of an automobile having my device in a preferred form mounted thereon.

Fig. 2 is a similar sectional view, on a larger scale, of a pair of electric contact members and associated parts shown in Fig. 1.

Fig. 3 is a reverse plan view of a splash-receiving cup constituting a part of said device.

Referring to the drawings, 10 is the transmission housing of an automobile of the Ford type, and 11 is the cover thereof. Said cover, although carrying the principal parts of my device, may be of the usual type, secured in place by the usual screws 12, 12.

Bolted to the under face of said cover is a U-shaped bracket 13, which may be of stamped metal, and pivoted at 14 in said bracket is a lever 15 extending longitudinally of the transmission housing, its front end having secured thereto a vented cup 16 adapted to receive, and to be weighed down by oil from the splash of the fly-wheel 18, against the force of a weight 17 adjustably secured to the rear end portion of the lever, the course of the oil received by the cup being roughly indicated by the arrow. The lever 15 is adapted to abut the floor of the U-shaped bracket 13 at 13$^a$ to limit the downward movement of the weighted end of the lever and thus to hold the cup somewhat below the cover 11 when the cup is empty, so that it will be in a position permitting free entry of oil thereinto when the splash again starts.

The vent of the cup 16, adapted to permit the weight 17 to actuate the lever in the opposite direction when the splash ceases or falls off to a determinate quantity, is here shown as an elongated slot 19, adapted to permit the oil to flow from the cup at a rate varying closely with the head of oil in the cup, so that the weight of oil in the cup is closely dependent upon the volume of the splash. Said slot has a vertical portion 19$^a$ extending downward from the lip of the cup, and terminates in an arcuate, substantially horizontal portion 19$^b$ in the bottom of the cup, the vertical portion of the slot being adapted to permit an escape of oil varying more greatly in response to change of head than would be the case with an aperture in the bottom of the cup only, the outflowing stream of oil, with the form of slot here shown, increasing in cross-section as well as in velocity as the head increases, so that the head of oil in the cup will vary with the volume of the splash throughout a wide range instead of quickly filling to its brim as soon as the splash exceeds a determinate volume, as would ordinarily occur with a shallow cup having a vent only in its bottom. It will be observed that the vertical portion 19$^a$ and the horizontal portion 19$^b$ of the slot 19, although connected as one continuous slot, in effect constitute individual vents, of different characteristics.

For determining the quantitative value of the splash at which the cup shall be weighed down, or cease to be weighed down, against the force of the weight 17, a sliding valve or gate 20 is pivoted at 21, concentrically with relation to the curved portion 19$^b$ of the slot, on the outer, bottom face of the cup, bearing firmly against the latter so as not to be easily knocked or jarred out of adjustment, but adapted by moderate force to be turned on its pivot to cover such part of the slot 19 as is necessary to set the device to function in response to a determinate condition of the oil supply, as desired. As the gate 20 is operable to close or partially close only the substantially horizontal portion of the slot, it is adapted to function, for adjustment, in that part of the slot where outflow of oil is least affected by variation of head, so that it may be adjusted without interfering with the wide-range effect of the vertical portion of the slot, above described, and without preventing the cup from completely emptying when the splash ceases.

The cup is preferably formed, as here shown, with an in-turned lip 22, adapted to prevent splashing of oil therefrom, in order that the accuracy of the device may not be unduly affected by motion of the automobile or the like upon which it is used, the in-turned lip also preferably being turned down so far as to direct oil into the cup, and thus to utilize a sufficiently large part of the splash to actuate the device without requiring a very large cup.

Although I do not wholly limit my claims thereto, I have here shown means, actuated by the lever 15, for showing a light when the oil splash is above a determinate value, said means comprising a wire-holding bracket 23 of approximately the shape of a flattened C, which bracket may be of bent sheet metal and has a base portion 23ª, a portion 23ᵇ rising from one end thereof, an upper reach 23ᶜ above and parallel with said base portion, and a short, downwardly bent, terminal, wire-anchoring portion 23ᵈ adjacent but offset from the end of the base portion 23ª. Said base portion lies upon the upper face of the cover 11 and is formed near its end with a threaded aperture adapting it to serve as a nut upon a square-flanged guide-bushing 24 mounted in an aperture in the cover 11. Said base portion may be normally of slightly arched form, as shown, so as to bear yieldingly against the cover 11 as it is tightened on the bushing, to prevent it from loosening thereon.

The rising portion 23ᵇ of said bracket is formed with an aperture accommodating an insulated wire 25 which lies along the under face of the upper reach 23ᶜ of the bracket, extends through an aperture in the downwardly bent terminal portion 23ᵈ of the bracket, is downwardly bent into a groove stamped in the outer face of the latter, and terminate just below said face, the metal wire proper, 25ª, extending a little farther downward than its insulation, so as to serve as an electric contact.

The downwardly bent terminal portion of the wire 25 is preferably bent slightly more than 90° after the wire is threaded through the apertures in the bracket portions 23ᵇ and 23ᵈ, so that its own resilience will hold it snugly in the groove on the outer face of the bracket portion 23ᵈ when it is drawn thereto by pulling the wire backward through the rising bracket portion 23ᵇ and anchoring it under tension adjacent the latter, either by bending the wire sharply at the outer face of said bracket portion, as shown at 26, or by clamping it to the upper reach 23ᶜ of the bracket.

For so clamping the wire and also for securing the base portion of a tongue spring 27 adapted to be flexed against the wire terminal 25ª to coact therewith as an electric contact, a pair of bolts, one of which is shown at 28, extend through the upper reach 23ᶜ of the bracket, through a wire-clamping and spacer block 29, grooved to accommodate the wire, and through the base portion of the spring 27, and are provided below the latter with nuts, one of which is shown at 30.

For flexing the spring 27 against the wire terminal 25ª, a plunger 31 is slidably mounted in the guide-bushing 24, its ends bearing respectively against the lever 15 and the spring 27, the latter thus being adapted to compel said plunger to follow said lever downward when the weight 17 lifts the oil cup, as well as to be moved upward by said plunger to make contact when the cup is weighed down.

The wire 25 runs, through a switch 32 and an electric bulb 33 mounted upon the instrument board 34 of the automobile, to the latter's storage battery 35, being thus adapted to light said bulb when the oil cup is weighed down and the switch 32 is closed.

In the operation of the device, when a sufficient quantity of oil is present in the engine and the latter is operated at an appropriate speed the cup catches oil from the splash of the flywheel 18 and partially fills, notwithstanding loss of oil through the slot 19, overbalancing the weighted end of the lever 15, thus forcing the plunger 31 upward in the bushing 24, closing the spring contact 27 against the wire terminal 25ª, and thus grounding the wire 25 to the frame of the automobile. At such times as the operator desires to ascertain the condition of his oil supply, he closes the switch 32, which lights the bulb 33 when the splash is of a determinate strength, whereas if the splash is absent or is weak the escape of oil through the slot 19 permits the weight 17 to overbalance the cup, the spring 17 then not contacting the wire terminal 25ª, so that closing of the switch 32 will fail to light the bulb 33.

As the volume of the splash depends upon the quantity of oil in the engine, as well as the speed of the latter, the device may be utilized to determine whether the amount of oil contained in the engine is above or below a determinate amount, the engine being driven at a determinate speed, or the amount of oil actually present may be ascertained, after a scale for a given setting of the device has been established by test and measurement, by noting the speed at which the bulb 33 is lighted or quenched, the switch 32 being left closed.

The elongate form of the slot 19, adapting it to be closed very gradually by the gate 20, as well as the adjustability of the weight 17 upon the lever 15, permits a very delicate setting of the device, while the vertical portion of the slot 19, when present, permits settings throughout a wide range.

The oil-receiving receptacle itself being adapted to be moved by the force of the oil received directly from the splash, no float-tank is required, and as jolting of the automobile acts with substantially the same effect upon the cup-lever-arm and upon the weight-lever-arm, and with the greater force downward upon the dominating one of the two, such jolting largely neutralizes itself in its effect upon the accuracy of the device, as contrasted with a float-actuated device, in which the float rises and falls as the liquid upon which it floats is disturbed. I do not wholly limit myself, however, to a device in which the oil-receiving member acts vertically or in which it is actuated in large measure, as here shown, by weight of the oil as distinguished from impact of the splash.

The device is of simple construction and of few and inexpensive parts. Excepting its electrical connections, it is carried entirely by the transmission-housing cover, being accommodated by the limited available space within the latter, so that it may be simply removed with said cover as for inspection, adjustment or repair, and it requires no modification of established types of automobiles other than the drilling of three holes in the transmission case cover and the mounting of the electrical connections.

The bracket 23 and parts mounted thereon are of such construction and dimensions as to be accommodated in the small space between the transmission-housing and the footboard of Ford automobiles as they are now constructed, and yet to provide the electric making and breaking elements on the exterior of the engine housing so as to avoid danger of explosion or fire from the sparking of said elements.

The device as shown and described is susceptible of considerable modification within the scope of my invention, and I of course do not wholly limit my claims to this specific embodiment.

I claim:

1. In combination with a mobile engine and an oil-containing casing therefor, means in said casing for lubricating the said engine by the splash system, an instrumentality mounted on the exterior of said casing, and means adapted to be actuated by the splash and to actuate said instrumentality, the last said means comprising a member movably mounted in said casing in position directly to intercept oil of the splash and to be moved in one direction thereby, and yielding means urging the said member in the opposite direction, the said member being adapted to be urged against the force of said yielding means primarily by the force of oil directly intercepted by said member, the said oil-intercepting means and the said yielding means being so constructed and arranged as substantially to eliminate inertia thereof as a factor of error in the operation of the device.

2. In combination with a mobile engine and an oil-containing casing therefor, means in said casing for lubricating said engine by the splash system, a lever of the first class pivoted in said housing on a substantially horizontal axis, weighting means on one arm of said lever, a cup mounted on the other arm of said lever, formed with an oil vent and adapted to receive oil from the splash and with the added weight thereof to actuate said lever against the force of said weighting means, and means extending to the exterior of said casing and adapted to be actuated by said lever for manifesting the presence of said splash.

3. A combination as defined in claim 1 in which the casing has an opening through its upper wall and a removable cover for said opening and in which all of the defined instrumentalities which are enclosed in the casing are mounted upon and removable with the said cover.

4. In combination with a mobile, splash-lubricated mechanism, a splash-actuated device comprising a splash-receiving cup formed with an elongated, vertically disposed vent in a side wall thereof and with an elongated, horizontally disposed vent near the bottom thereof.

5. In combination with a mobile, splash-lubricated mechanism, a splash-actuated device comprising a splash-receiving cup formed with an elongated, vertically disposed vent in a side wall thereof and with a vent in or adjacent the bottom thereof, and a gate for the latter.

6. In combination with a mobile engine lubricated by the splash system and enclosed in a housing having an opening through its upper wall, a removable cover for said opening, a lever pivotally secured to the under face of said cover for vertical oscillation, a vented, splash-receiving cup on said lever, means for counter-weighting said cup, a plunger mounted in and traversing said cover and adapted to be actuated by said lever, and electric contact members exterior to said cover and adapted to be automatically connected and disconnected by movement of said plunger.

7. In combination with a mobile engine lubricated by the splash system and enclosed in a housing having an opening through its upper wall, a removable cover for said opening, a counter-weighted vented, splash-receiving cup within said housing, and a member slidably mounted in an aperture in said cover and adapted to be actuated therein by movement of said cup.

In witness whereof I have hereunto set my hand this 10th day of January, 1924.

JAMES H. WARRICK.